April 15, 1958
H. T. WALKER ET AL
2,830,644
STRETCH BENDING MACHINE HAVING GRIPPING JAWS
MOUNTED TO MAINTAIN DIRECTION OF PULL ON
METAL MOLDING TANGENT TO FORMING DIE
Filed Aug. 30, 1956
12 Sheets-Sheet 1
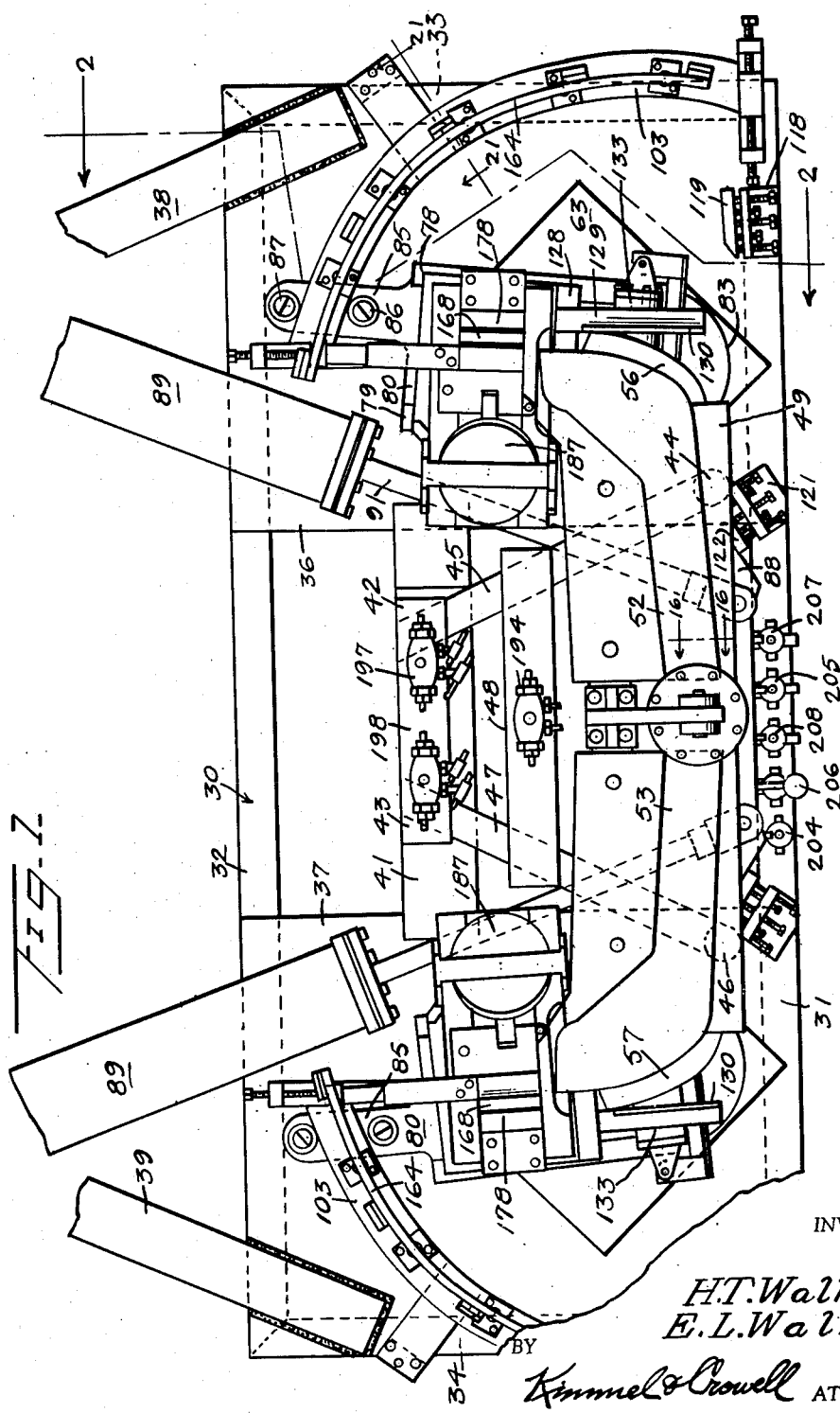
INVENTORS
H.T. Walker
E.L. Walker
BY
Kimmel & Crowell ATTORNEYS April 15, 1958    H. T. WALKER ET AL    2,830,644
STRETCH BENDING MACHINE HAVING GRIPPING JAWS
MOUNTED TO MAINTAIN DIRECTION OF PULL ON
METAL MOLDING TANGENT TO FORMING DIE
Filed Aug. 30, 1956                           12 Sheets-Sheet 2
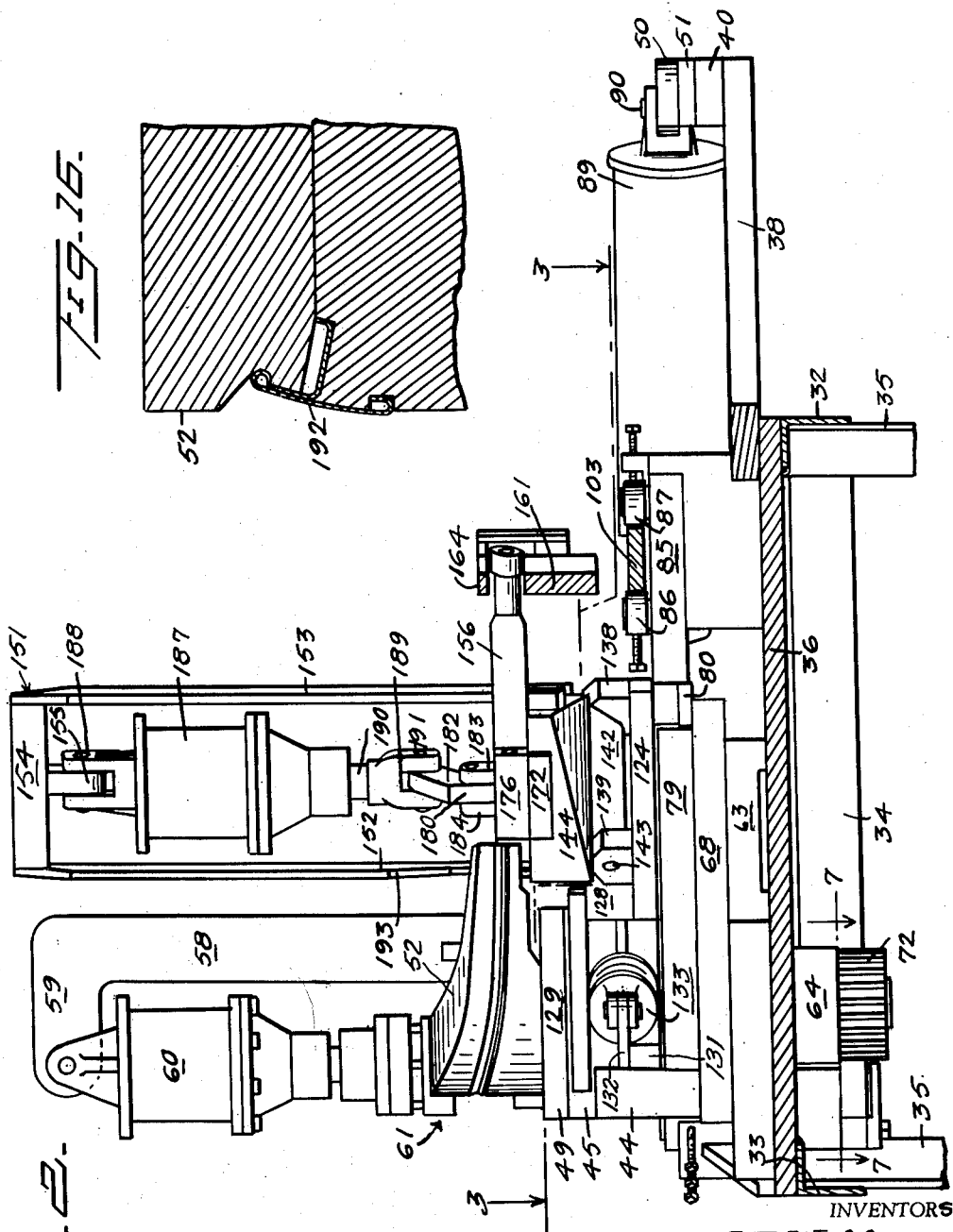
INVENTORS
*H.T.Walker*
*E.L.Walker*
BY
*Kimmel & Crowell* ATTORNEYS

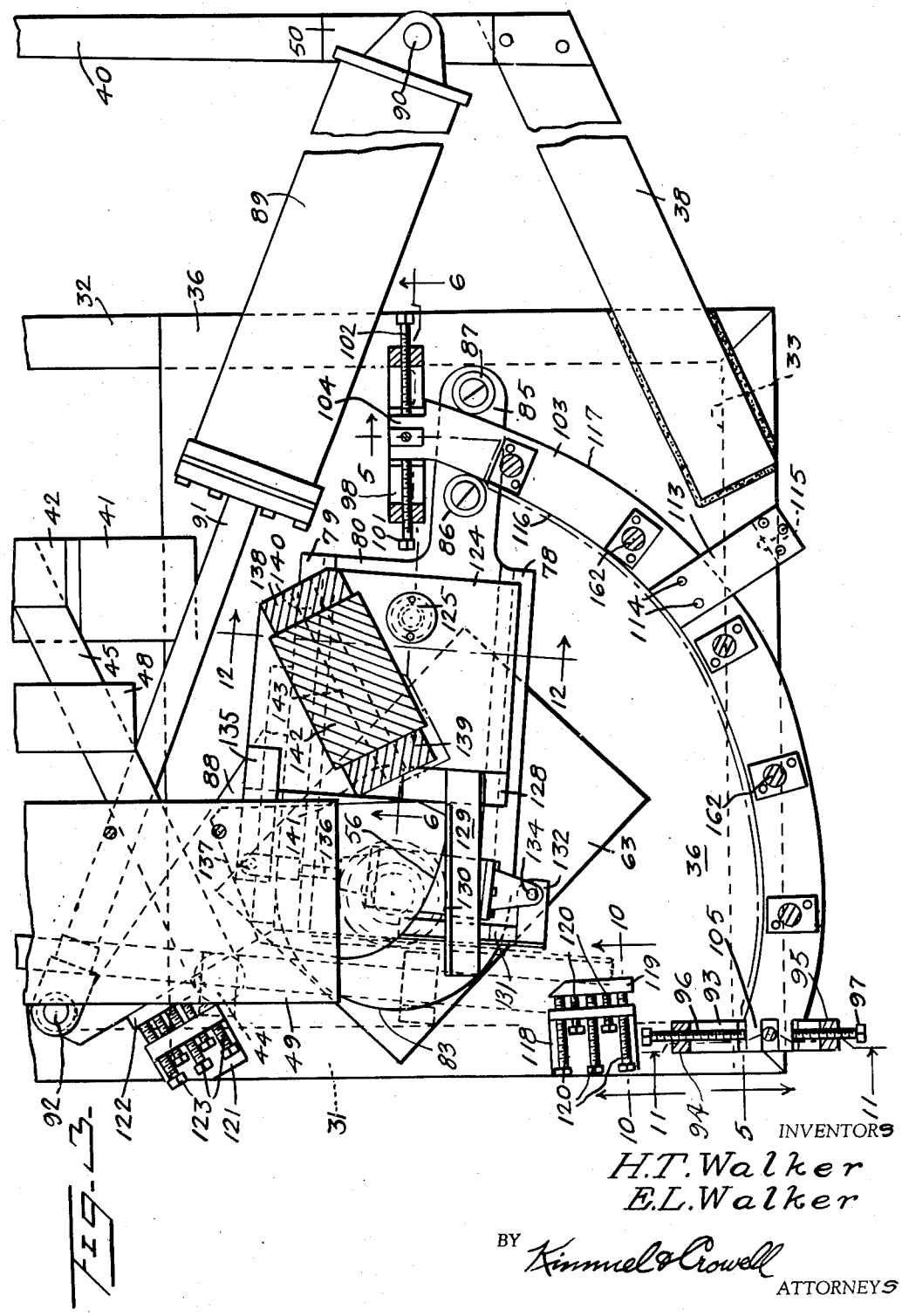

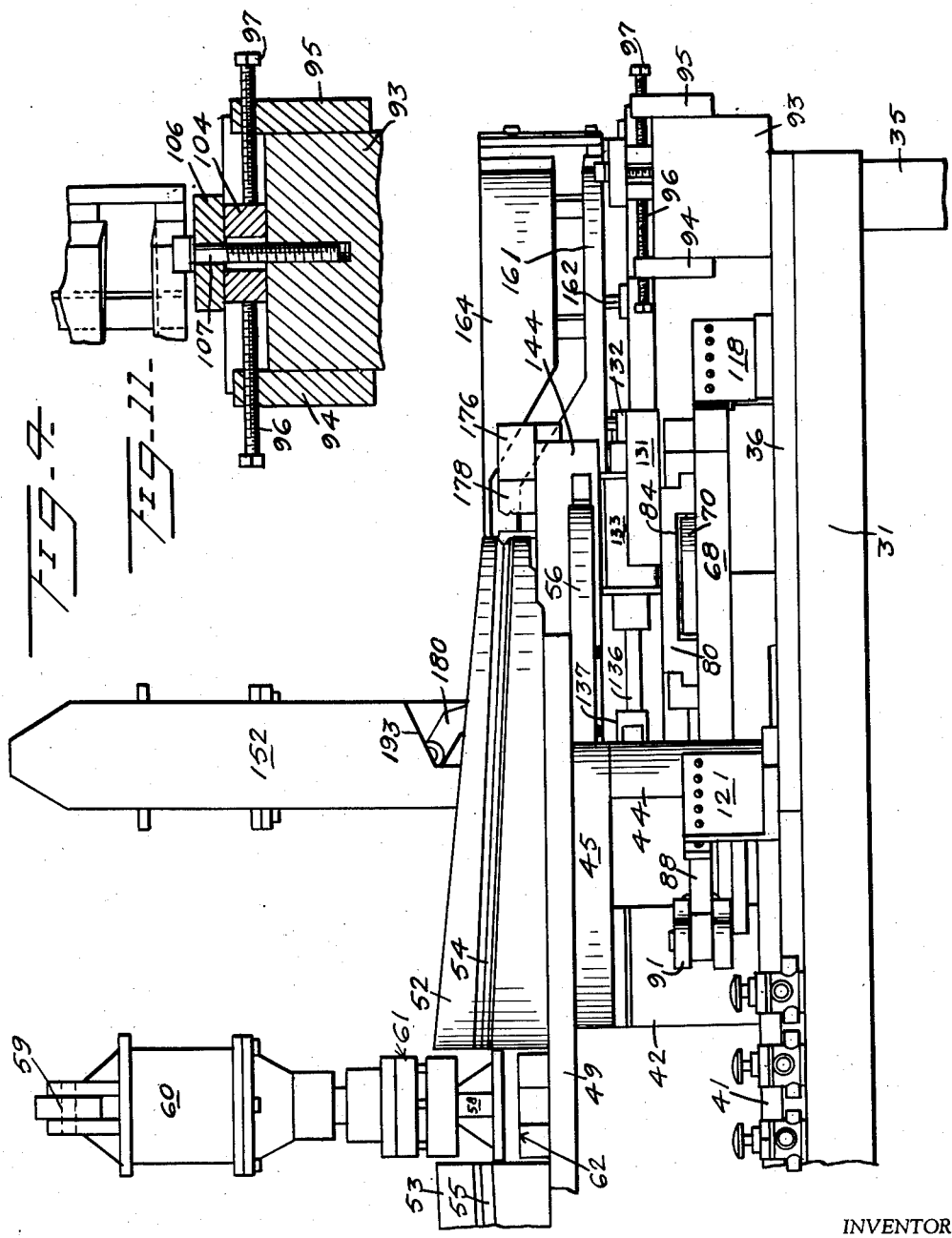

April 15, 1958   H. T. WALKER ET AL   2,830,644
STRETCH BENDING MACHINE HAVING GRIPPING JAWS
MOUNTED TO MAINTAIN DIRECTION OF PULL ON
METAL MOLDING TANGENT TO FORMING DIE
Filed Aug. 30, 1956   12 Sheets-Sheet 5
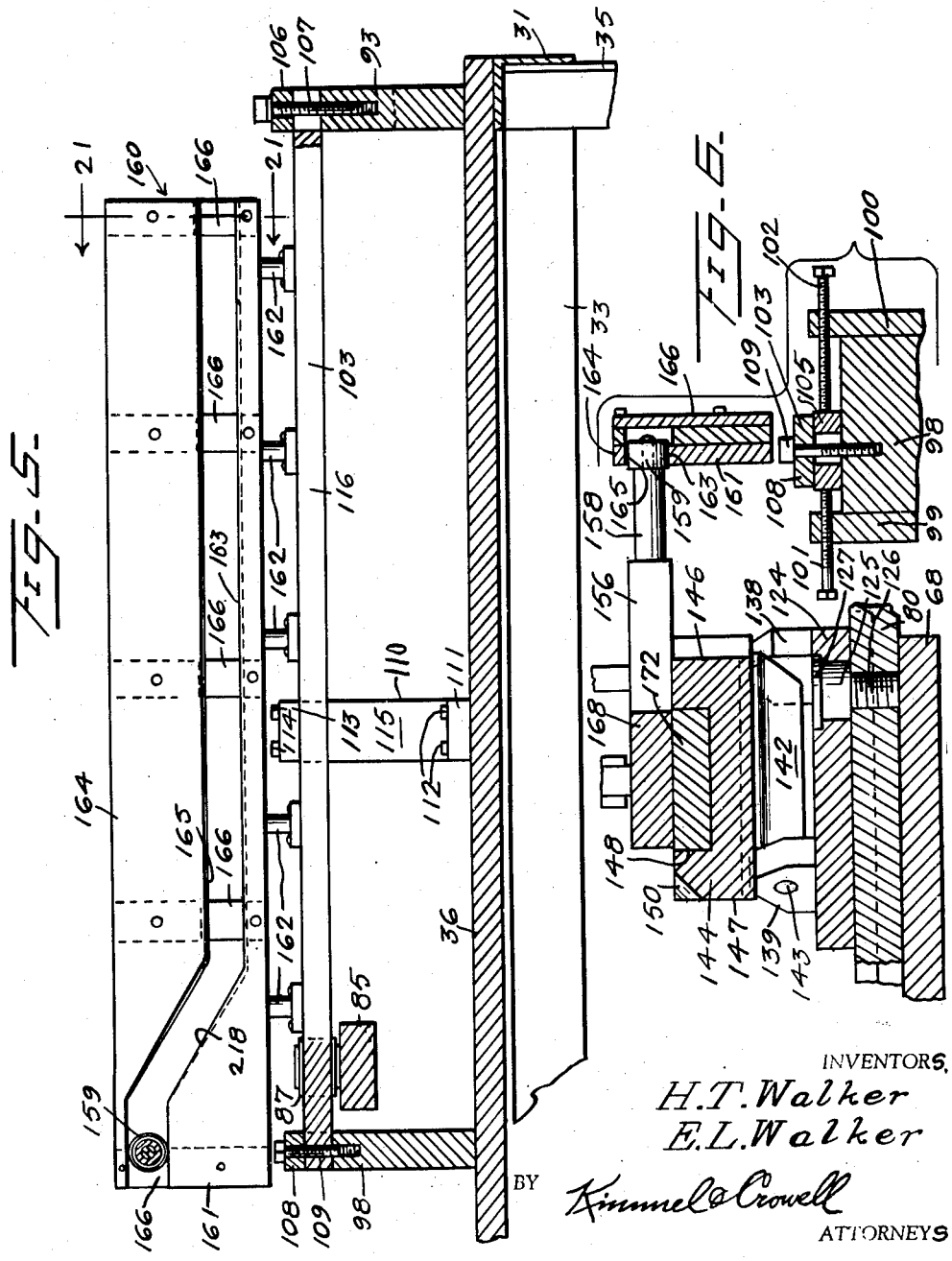
INVENTORS,
H.T. Walker
E.L. Walker
BY Kimmel & Crowell
ATTORNEYS

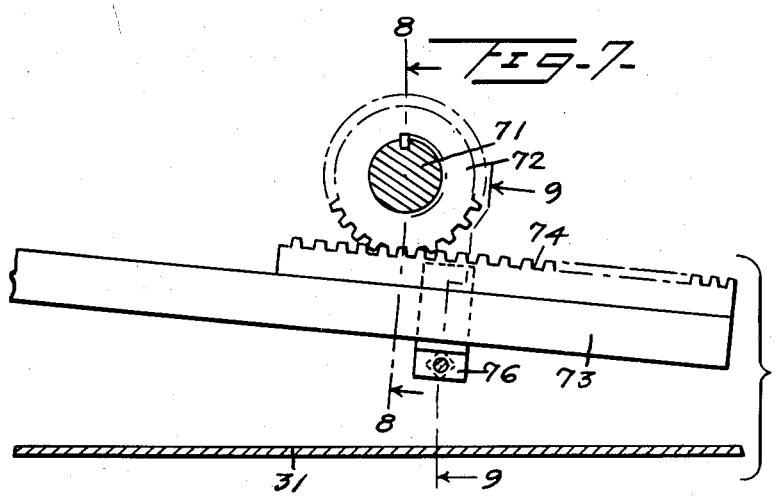
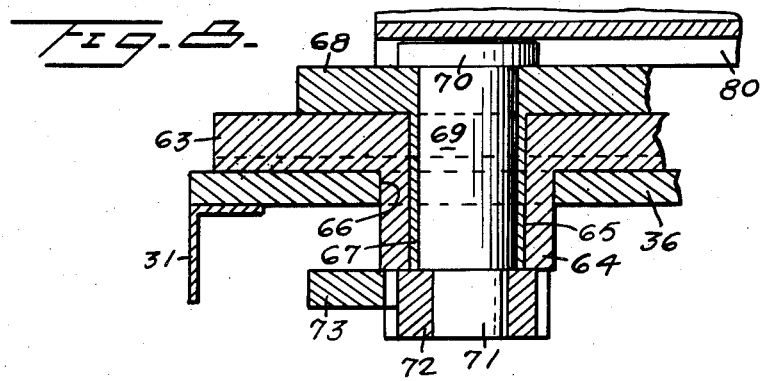
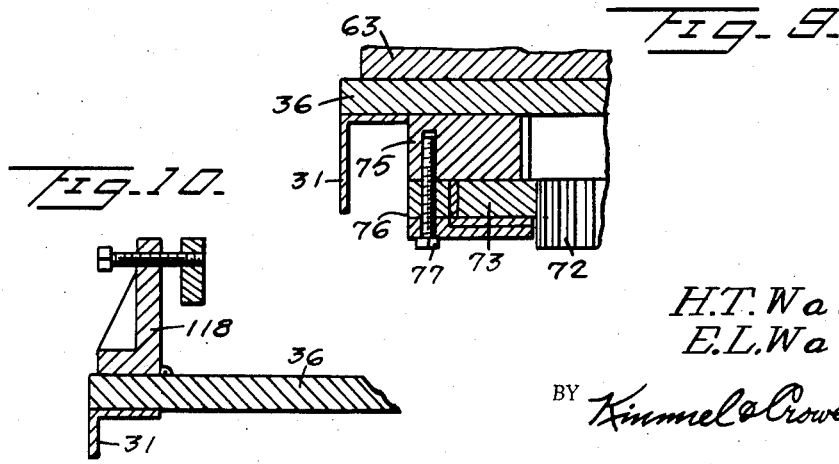
INVENTORS
H.T. Walker
E.L. Walker
BY Kimmel & Crowell
ATTORNEYS April 15, 1958 H. T. WALKER ET AL 2,830,644
STRETCH BENDING MACHINE HAVING GRIPPING JAWS
MOUNTED TO MAINTAIN DIRECTION OF PULL ON
METAL MOLDING TANGENT TO FORMING DIE
Filed Aug. 30, 1956 12 Sheets-Sheet 7
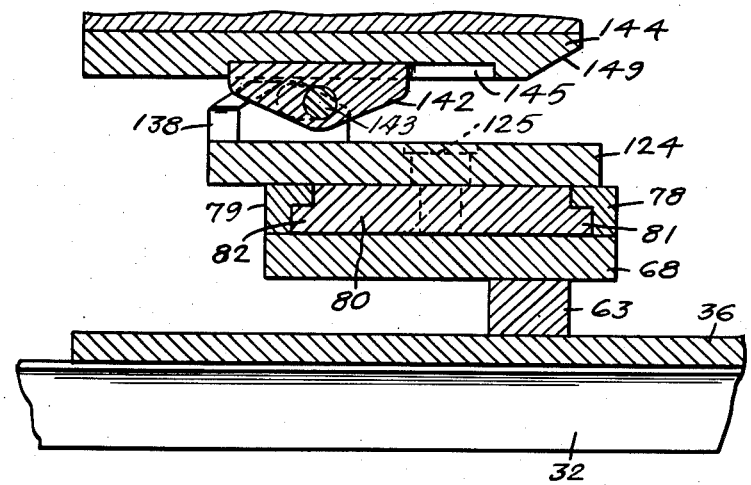
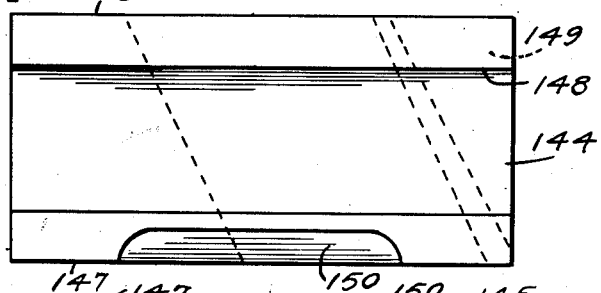
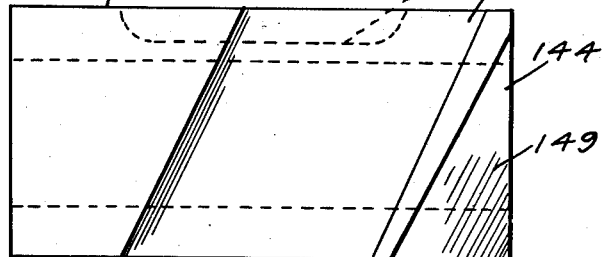
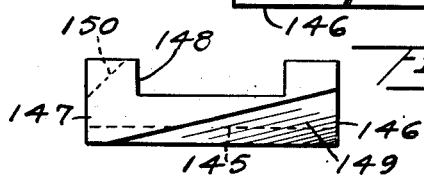
INVENTORS
H. T. Walker
E. L. Walker
BY
Kimmel & Crowell
ATTORNEYS

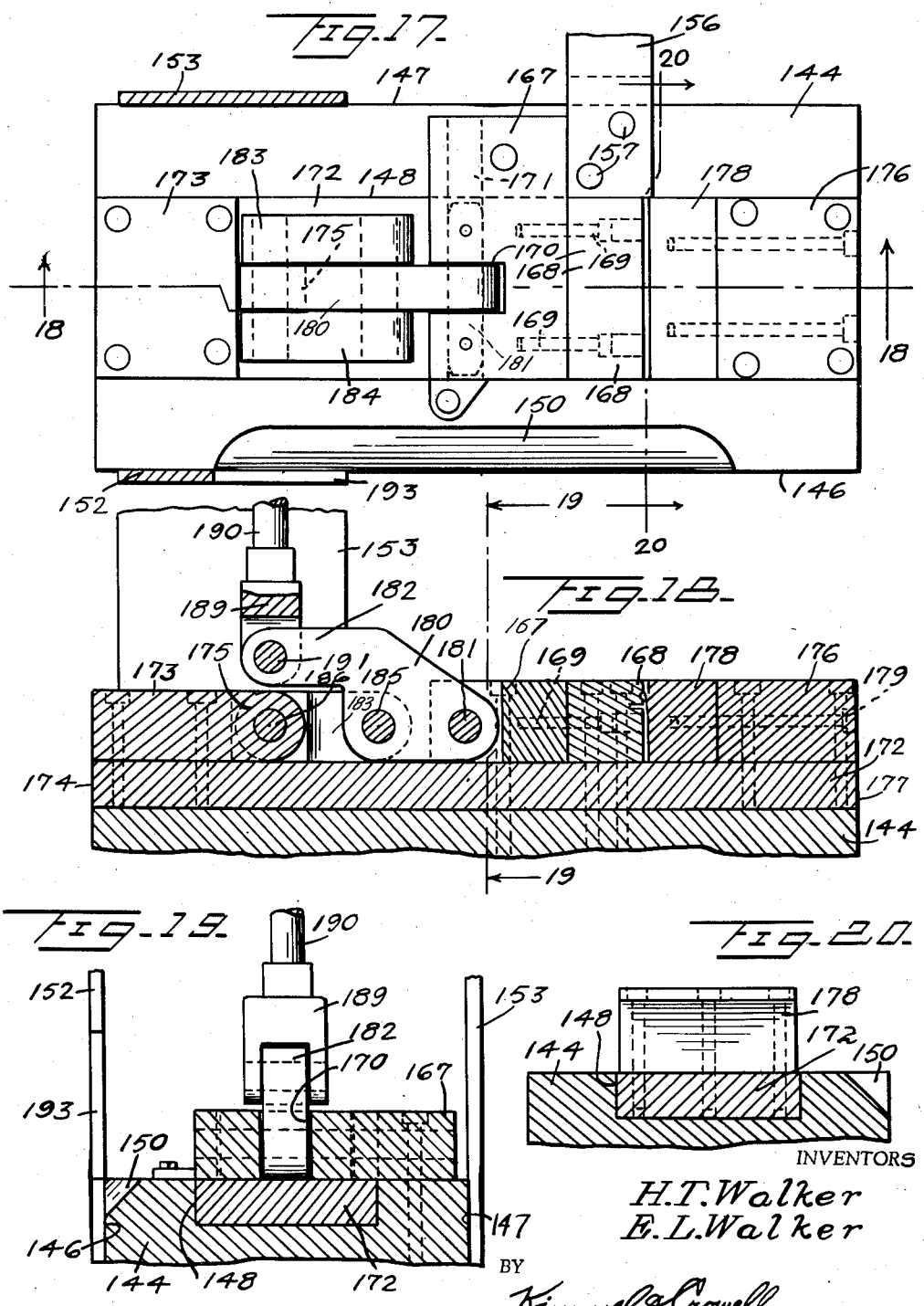

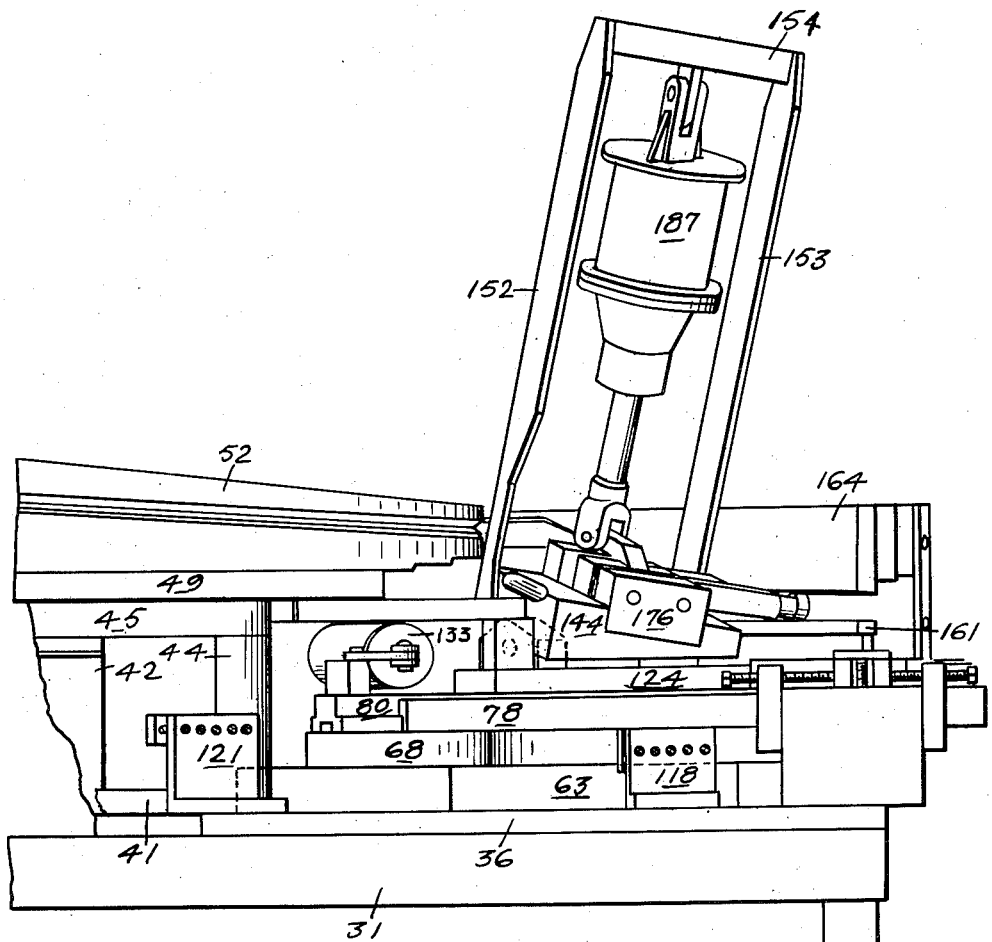
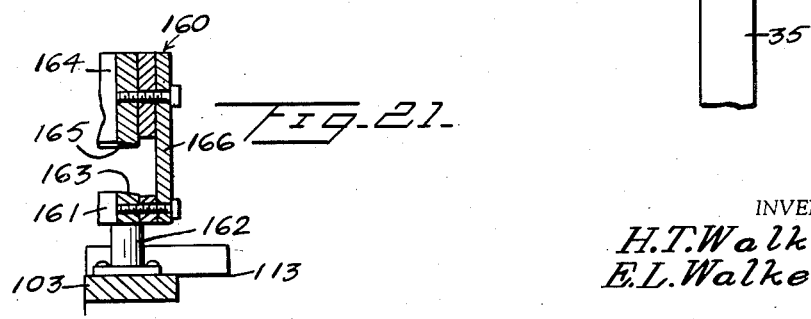

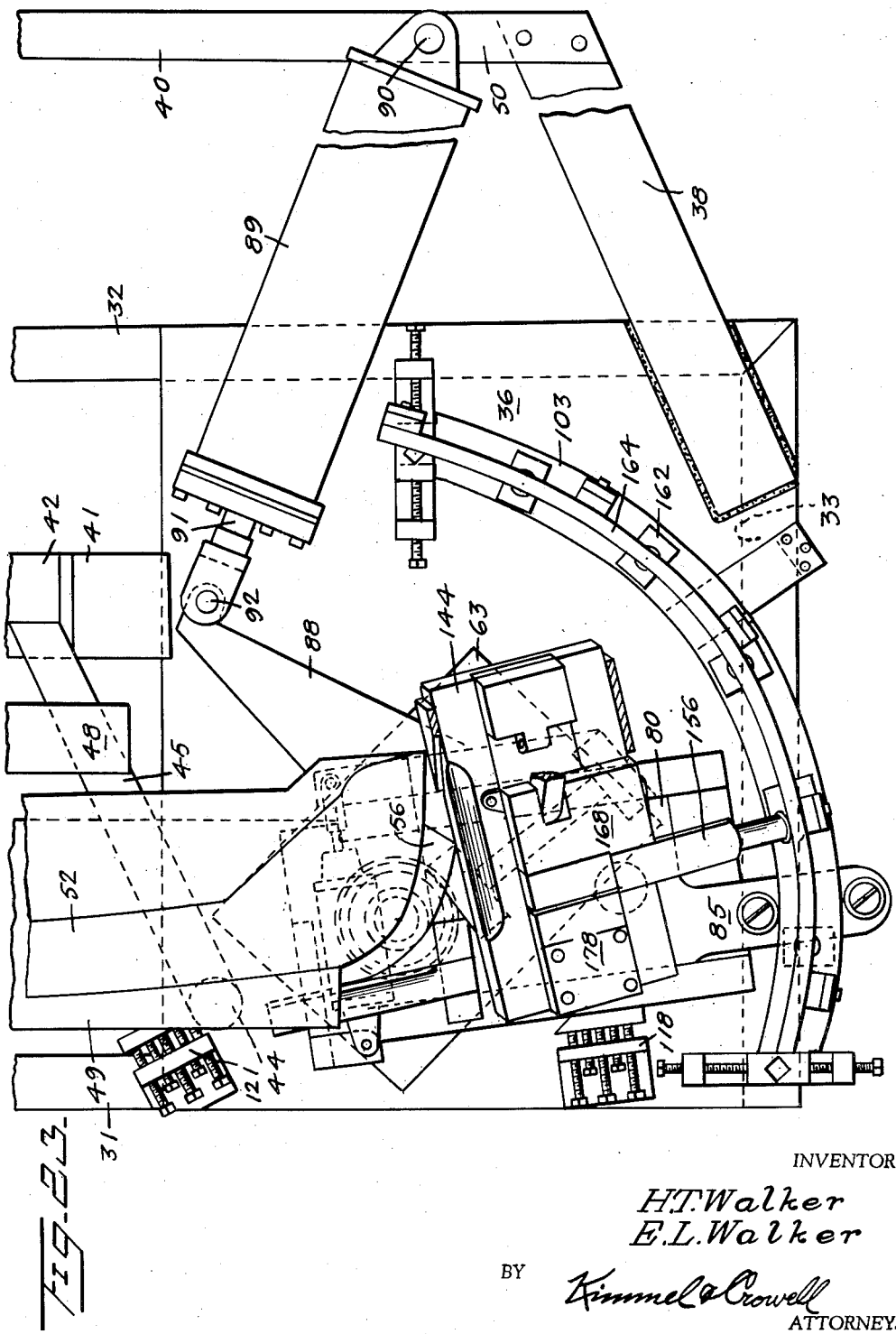

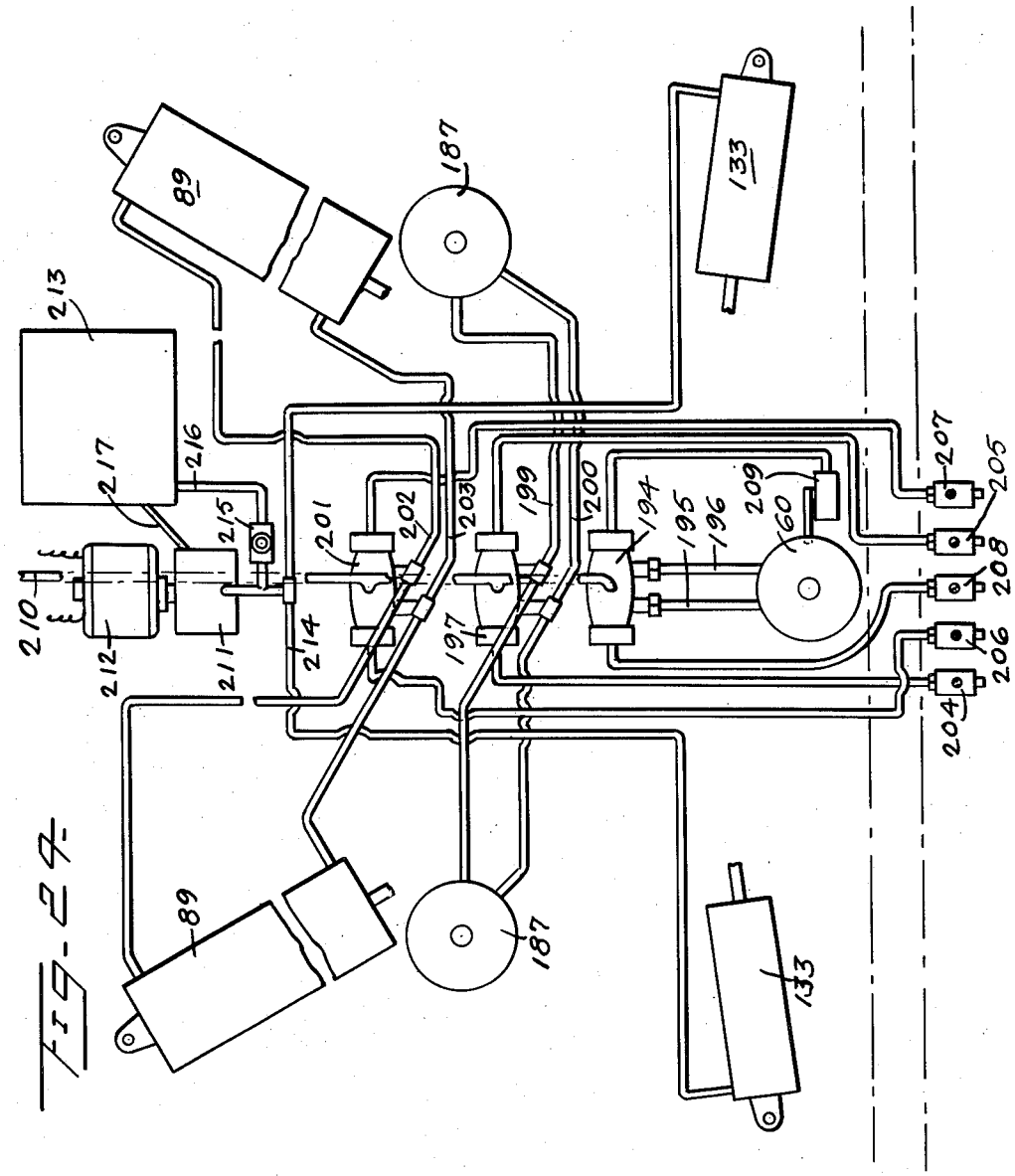

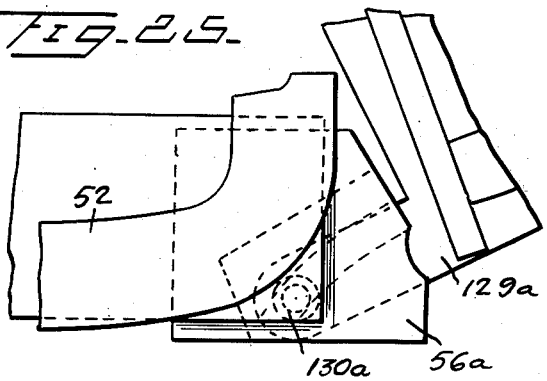
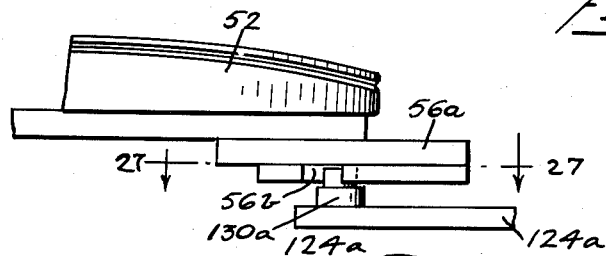
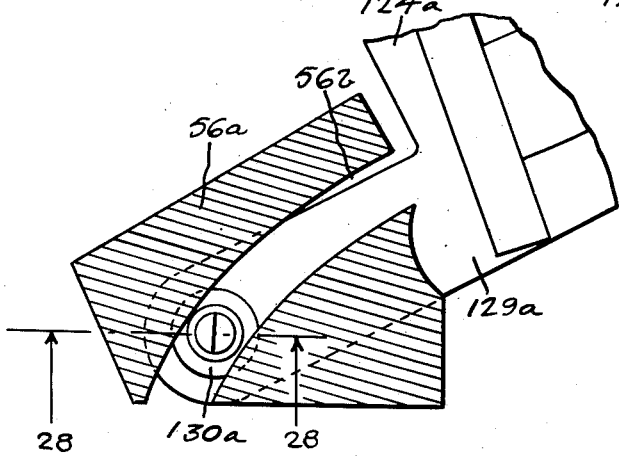
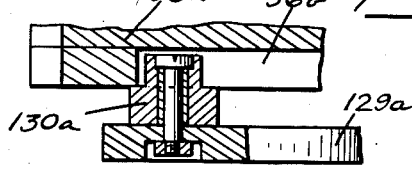

United States Patent Office 2,830,644
Patented Apr. 15, 1958

2,830,644

STRETCH BENDING MACHINE HAVING GRIPPING JAWS MOUNTED TO MAINTAIN DIRECTION OF PULL ON METAL MOLDING TANGENT TO FORMING DIE

Herbert T. Walker and Ervin L. Walker, Atlanta, Ga.

Application August 30, 1956, Serial No. 607,128

6 Claims. (Cl. 153—32)

The present invention relates to stretch-benders for metal shapes, and more particularly to a device for forming shaped metal molding into compound and curved form.

The primary object of the invention is to provide means for simultaneously stretching and bending a length of metal molding about a forming die.

Another object of the invention is to provide a device of the character described above having means for guiding the stretching and bending operation in horizontal and vertical planes.

A further object of the invention is to provide a stretch-bending machine for forming compound curves in metal molding in which the opposite ends of the molding are formed in duplicate by reversed curves.

Another object of the invention is to provide a stretch-bending apparatus for forming metal moldings which can be adapted to the formation of metal moldings having different curvatures.

A further object of the invention is to provide a stretch-bending apparatus of the class described above which is economical to manufacture, simple to operate, and adapted to automatic control and extremely durable in commercial heavy duty service.

Other objects and advantages will be found in the following specification when considered in the light of the attached drawings, in which:

Figure 1 is a fragmentary plan view of the invention shown partly broken away for convenience of illustration.

Figure 2 is an enlarged transverse section taken substantially along the line 2—2 of Figure 1, looking in the direction of the arrows.

Figure 3 is an enlarged fragmentary horizontal cross-section taken substantially along the line 3—3 of Figure 2, looking in the direction of the arrows.

Figure 4 is a fragmentary front elevation of the invention showing in detail the right end of the machine.

Figure 5 is an enlarged fragmentary transverse cross-section taken substantially along the line 5—5 of Figure 3, looking in the direction of the arrows.

Figure 6 is an enlarged fragmentary transverse cross-section taken substantially along the line 6—6 of Figure 3, looking in the direction of the arrows.

Figure 7 is an enlarged fragmentary horizontal cross-section taken substantially along the line 7—7 of Figure 2, looking in the direction of the arrows.

Figure 8 is an enlarged fragmentary transverse cross-section taken substantially along the line 8—8 of Figure 7, looking in the direction of the arrows.

Figure 9 is an enlarged fragmentary transverse cross-section taken substantially along the line 9—9 of Figure 7, looking in the direction of the arrows.

Figure 10 is an enlarged fragmentary vertical cross-section taken along the line 10—10 of Figure 3, looking in the direction of the arrows.

Figure 11 is an enlarged fragmentary longitudinal cross-section taken along the line 11—11 of Figure 3, looking in the direction of the arrows.

Figure 12 is an enlarged fragmentary vertical cross-section taken along the line 12—12 of Figure 3, looking in the direction of the arrows.

Figure 13 is a top plan view of the clamp base.

Figure 14 is a bottom plan view of the clamp base.

Figure 15 is an end elevation of the clamp base.

Figure 16 is an enlarged fragmentary transverse cross-section taken along the line 16—16 of Figure 1, looking in the direction of the arrows.

Figure 17 is an enlarged fragmentary plan view of the clamp mechanism shown partially broken away and in section for clarity of illustration.

Figure 18 is a longitudinal cross-section taken substantially along the line 18—18 of Figure 17, looking in the direction of the arrows.

Figure 19 is a transverse cross-section taken substantially along the line 19—19 of Figure 18, looking in the direction of the arrows.

Figure 20 is a fragmentary transverse cross-section taken along the line 20—20 of Figure 17, looking in the direction of the arrows.

Figure 21 is an enlarged fragmentary transverse cross-section taken along the line 21—21 of Figure 1, looking in the direction of the arrows.

Figure 22 is a fragmentary front elevation similar to Figure 4, illustrating the mechanism in another position.

Figure 23 is a fragmentary top plan view illustrating the mechanism in the same position as shown in Figure 22.

Figure 24 is a diagrammatic view of the pneumatic and hydraulic systems.

Figure 25 is a fragmentary top plan view of a modified form of the cam plate for maintaining the direction of pull of the work gripping jaws tangent to the forming die.

Figure 26 is a fragmentary front elevation of the modification illustrated in Figure 25.

Figure 27 is an enlarged horizontal cross-section taken along the line 27—27 of Figure 26, looking in the direction of the arrows.

Figure 28 is a fragmentary vertical cross-section taken along the line 28—28 of Figure 27, looking in the direction of the arrows.

Referring now to the drawings in detail wherein like reference characters indicate like parts throughout the several figures, the reference numeral 30 indicates generally a table forming the base for our new and improved stretch-bending apparatus. The table 30 includes a pair of spaced apart parallel longitudinally extending front and rear angle iron frame members 31 and 32, respectively, which are connected at their opposite ends by means of spaced apart parallel right and left angle iron frame members 33 and 34, respectively.

A plurality of angle iron legs 35 depend from the table 30 and are supported in spaced relation with respect to the floor. A base plate 36 is positioned at the right end of the table 30 and is supported by the front and rear frame members 31 and 32 and the right end frame member 33, as best illustrated in Figure 1.

A base plate 37 is positioned at the left end of the table 30 and is supported by the front and rear frame members 31 and 32 and the left end frame member 34, respectively. The base plates 36 and 37 are spaced apart a substantial distance, as also best seen in Figure 1. The angle iron frame members 31, 32, 33 and 34, angle iron legs 35, and base plates 36 and 37 are secured together in a unit by means of welding or the like.

A bar 38 has its forward end welded to the right end of the base plate 36 and projects rearwardly beyond the rear frame member 32 diverging slightly to the left. A bar 39 has its forward end secured to the left end of the base plate 37 and projects rearwardly beyond the frame member 32 diverging at an angle to the right. A connector bar 40 extends between the rear terminal ends of the bars 38 and 39 and is secured thereto by any suitable means with the bar 40 extending parallel to the frame member 32.

A horizontal rear support plate 41 extends between the adjacent spaced portions of the base plates 36 and 37 in parallel relation and spaced from the rear frame member 32, as best illustrated in Figure 1.

A pair of oppositely disposed pedestals 42 and 43 are positioned adjacent opposite ends of the support plate 41 and extend upwardly therefrom. A pedestal leg 44 extends upwardly from the base plate 36 and carries the forward end of a transverse beam member 45 which has its rear end resting on the pedestal 42. A pedestal leg 46 is positioned on the base plate 37 and carries at its upper end the forward end of a transverse beam member 47 which has its rear end carried by the pedestal 43.

The beam members 45 and 47 are in a plane parallel to the top of the table 30 and converge rearwardly. A support plate 48 is supported on the beam members 45 and 47 forwardly of the rear ends and parallel to the rear support plate 41. A die table 49 having a generally rectangular shape is supported on the forward portions of the beam members 45 and 47.

The connector bar 40 adjacent each end thereof is provided with plates 50 which are spaced above the connector bar 40 in parallel relation thereto by means of spacer plates 51.

A pair of oppositely extending forming dies 52 and 53 are carried by the die table 49 and extend longitudinally beyond the end thereof. The dies 52 and 53 are provided with forming grooves 54 and 55 along the forward and outer end faces thereof. The inner ends of the dies 52 and 53 are spaced apart for reasons to be assigned. A pair of cam plates 56 and 57 are secured to opposite ends of the die table 49 in underlying relation thereto and project longitudinally beyond the ends thereof, as best illustrated in Figure 1. The die table 49 has secured thereto intermediate its ends an upwardly projecting arm 58 having a forwardly extending upper end portion 59 integrally formed thereon.

A pneumatic ram 60 is secured to the forwardly extending portion 59 of the arm 58 and depends therefrom. A combination die forming and cut off mechanism 61 is secured to the pneumatic ram 60 and is adapted to cooperate with an anvil structure generally indicated at 62 to operate conventionally for a purpose to be described below.

In describing the remaining structure of the invention, since the combination die forming and cut off mechanism 61 and certain of the valve structures are common, while the other structures are duplicated in reversed relation at opposite ends of the table 30, only the mechanism at the right end of the machine will be specifically described, the left end of the machine having identical mechanism in reversed relation.

A rectangular mounting plate 63 is secured to the base plate 36 at an angle thereto, as best illustrated in Figure 3. The mounting plate 63 has a depending boss 64 formed thereon and provided with a vertical bore 65 extending therethrough. The boss 64 projects through a bore 66 in the base plate 36, as best seen in Figure 8.

A wear bushing 67 is mounted in the bore 65 to serve as a journal. A swivel plate 68 is positioned on the mounting plate 63 and is pivoted thereto by means of a pivot pin 69 having a circular head 70 engaged over the upper edge of the swivel plate 68. The pivot pin 69 extends through the wear bushing 67 and is provided with a reduced end portion 71 projecting below the boss 64.

A pinion gear 72 is secured to the reduced end portion 71 by any suitable means. A connector bar 73 is provided with rack teeth 74 along one edge thereof in engagement with the pinion gear 72. A spacer block 75 is secured to the underside of the base plate 36 to space the connector bar 73 below the base plate 36. An L-shaped connector bar support bracket 76 is secured to the spacer block 75 by means of a bolt 77, as best seen in Figure 9.

The connector bar 73 has at its opposite ends the rack teeth 74 formed on the forward face thereof and engages the gear 72 at the left end of the machine on its rear side so as to cause the pivots 69 to move equally and opposite. The swivel plate 68 is secured to the pivot pin 69 to prevent relative rotation therebetween. The swivel plate 68 has secured to the upper surface thereof adjacent the opposite side edges a pair of inverted L-shaped guide rails 78 and 79, as best seen in Figure 12.

A stretch slide plate 80 is carried on the upper surface of the swivel plate 68 and is provided with tongues 81 and 82 projecting oppositely from the longitudinal side edges thereof engaging with the rails 78 and 79 so that the slide plate 80 is longitudinally slidable with relation to the swivel plate 68.

The slide plate 80 is provided with an arcuate end 83 and has a recess 84 formed therein to provide clearance for the head 70 of the pivot pin 69. The end of the slide plate 80 opposite the arcuate end 83 has extending therefrom an elongated roller tongue 85. The roller tongue 85 is laterally offset to the side of the slide plate 80 carrying the tongue 81. The roller tongue 85 has journalled thereon spaced apart rollers 86 and 87 for reasons to be assigned.

An obliquely extending angular arm 88 is secured to the longitudinal edge of the swivel plate 68 carrying the guide rail 79 by any suitable means. A pneumatic ram 89 is pivoted at 90 to the plate 50, as shown in Figures 2 and 3. The piston rod 91 extending from the ram 89 is pivoted at 92 to the end of the angular arm 88 so that movement of the piston rod within the ram 89 will swing the swivel plate 68 about the pivot pin 69.

The cam support 93 is mounted at the forward edge of the base plate 36 adjacent the right end thereof and has a generally rectangular form. A pair of ears 94 and 95 project upwardly from the opposite side edges of the cam support 93 above the upper surface thereof.

A pair of axially aligned adjustment screws 96 and 97 are threadedly engaged in the upper ends of the ears 94 and 95, respectively. A cam support plate 98 is secured to the rear edge of the base plate 36 intermediate the ends thereof and has projecting upwardly from opposite sides thereof ears 99 and 100. The ears 99 and 100 extend above the upper edge of the cam support plate 98 and have threadedly engaged in opposed axial relation therein adjustment screws 101 and 102.

A stretch cam bar 103 is provided with bifurcated ends 104 and 105 which are supported by cam supports 93 and 98, respectively. A clamp 106 engages the bifurcated end 104 and by means of a bolt 107 extending therethrough and into the cam support 93 secures the cam bar 103 in position. The adjustment screws 96 and 97 permit a minute lateral adjustment of the cam 103 on the cam support 93.

A clamp 108 engages against the bifurcated end 105 and by means of a bolt 109 extending therethrough and into the cam support 98 clamps the cam bar 103 in position. The adjustment screws 101 and 102 provide means for minutely adjusting the position of the cam bar 103 with relation to the cam support 98. The medial portion of the stretch cam bar 103 is supported by a U-shaped bracket 110 having one leg 111 thereof detachably secured to the base plate 36 by means of bolts 112, and the other leg 113 thereof secured to the upper face of the stretch cam bar 103 by means of bolts 114. The upright portion 115 of the U-shaped bracket 110 is spaced a substantial distance away from the outer edge of the stretch cam bar 103.

The stretch cam bar 103 has the inner face 116 thereof engaged by the roller 86 on the roller tongue 85, and the outer face 117 engaged by the roller 87 on the roller tongue 85 so that the slide plate 80 will be reciprocated with relation to the swivel plate 68 upon swivel movement of the swivel plate 68.

An L-shaped stop bracket 118 is secured to the base plate 36 at the forward edge thereof immediately adjacent the cam support 93. The L-shaped bracket 118 is provided with a stop plate 119 adjustably secured to the L-shaped bracket 118 by means of a plurality of bolts 120. The stop plate 119 is positioned to engage the side of the swivel plate 68 carrying the guide rail 78 to limit the forward movement thereof. An L-shaped stop bracket 121 is secured to the forward edge of the base plate 36 adjacent the inner edge thereof and carries thereon a stop plate 122 by means of a plurality of adjustment screws 123. The stop plate 122 is adapted to engage the angular arm 88 to limit the movement of the swivel plate 68 to the rear.

A clamp pivot plate 124 is mounted on the slide plate 80 and is pivotally carried thereon by means of a pivot pin 125. The pivot pin 125 has a threaded end portion 126 threaded into the slide plate 80 and is provided with a head 127 at its opposite end to secure the clamp pivot plate 124 against upward movement thereon.

The clamp pivot plate 124 has a block 128 secured to the upper face thereof adjacent the edge thereof opposite the roller tongue 85. A cam follower bar 129 is secured to the upper side of the block 128 so as to extend oppositely from the roller tongue 85. The cam follower bar 129 is in the same horizontal plane as the cam 56 and is adapted to engage thereagainst to guide the clamp pivot plate 124 during the swiveling action of the swivel plate 68. The cam follower bar 129 has detachably secured thereto a wear surface plate 130 which is adapted to engage the cam 56.

A mounting bar 131 is secured to the side plate 80 on the upper surface thereof adjacent the end opposite the roller tongue 85. The bracket 132 is carried by the outer end of the mounting bar 131 and projects rearwardly toward the roller tongue 85. A hydraulic ram 133 is pivotally secured to the bracket 132 at 134. A mounting bar 135 is carried by the upper face of the clamp pivot plate 124 adjacent the edge thereof opposite the cam follower bar 129.

The mounting bar 135 extends oppositely to the roller tongue 85 in the same general direction as the cam follower bar 129. The piston rod 136 projecting from the hydraulic ram 133 is pivoted at 137 to the mounting bar 135 so that pressure applied to the ram 133 will force the piston rod 136 against the mounting bar 135 moving the clamp pivot plate 124 on its pivot 125 to maintain the cam follower bar 129 in engagement with the cam 56 during the swiveling action of the swivel plate 68.

A pair of ears 138 and 139 are positioned on the clamp pivot plate 124 and are provided with axially aligned bores 140 and 141, respectively. The aligned bores 140 and 141 extend at an angle with relation to the side edges of the clamp pivot plate 124 and with relation to the end edges thereof. A boss 142 is positioned between the ears 138 and 139 and pivoted therein by means of a pivot pin 143.

A generally rectangular clamp base plate 144 is provided with a recess 145 extending angularly across the base thereof from side to side. The boss 142 is secured to the clamp base plate 144 within the recess 145 so that the side edges 146 and 147 of the base plate 144 extend generally parallel to the end edges of the clamp pivot plate 124.

The upper surface of the clamp base plate 144 is provided with a longitudinally extending rectangular recess 148 having its sides parallel to the sides 146 and 147. The undersurface at one end of the clamp base plate 144 is chamfered at an angle as indicated at 149 to permit the base plate 144 to tilt forwardly and downwardly with relation to the clamp pivot plate 124. The upper edge of the side 147 of the clamp base plate 144 is chamfered intermediate the ends thereof as at 150, to provide clearance for the plate 144 in its movement along the lower edge of die 52.

A yoke, generally indicated at 151, has an upright side plate 152 secured to the side 146 of the clamp base plate 144, and an upright side plate 153 is secured to the side 147 of the clamp base plate 144 in generally parallel relation to each other. The upper ends of the upright side plates 152 and 153 are connected by a cross member 154, as best seen in Figure 2. An ear 155 depends medially from the cross member 154.

An arm 156 is secured to the clamp base plate 144 by means of bolts 157 and extends perpendicularly to the side 147 thereof a substantial distance therebeyond. The arm 156 has a reduced outer end portion 158 and carries a roller 159 journalled to its outer extremity.

A fence cam generally indicated at 160 consists of an arcuate cam plate 161 supported on a plurality of short pedestals 162 carried by the upper surface of the cam bar 103. The arcuate cam plate 161 has its upper edge 163 formed into a cam surface. A second cam plate 164 is positioned in spaced relation to the cam plate 161 and has its lower edge 165 formed into a cam surface extending generally parallel to the cam surface 163. A plurality of support plates 166 extend from the outer side surface of the cam plate 161 to the outer side surface of the cam plate 164 to support the cam plate 164 in spaced relation to the cam plate 161.

Referring to Figures 6 and 21, it should be noted that the cam surfaces 163 and 165 are perpendicular to the sides at one end of the cam 160 and bevelled with relation to the sides at the other end of the cam 160. The roller 159 engages between the cam surfaces 163 and 165 and controls the movement of the clamp base plate 144 on the pivot 143 as the swivel plate 68 swivels on the pivot 69.

A stationary jaw support 167 is secured to the upper surface of the base member 144 intermediate its ends and perpendicular to the sides 146 and 147. A stationary jaw face 168 is secured to the jaw support 167 by any suitable means such as bolts 169. The stationary jaw support 167 is provided with a vertically extending slot 170 intersected by a bore 171. The slot 170 is positioned in the stationary jaw support 167 so as to be intermediate the sides 146 and 147 of the base member 144.

A generally rectangular slide 172 is positioned within the recess 148 and adapted to reciprocate therein. A block 173 is secured to the end 174 of the slide 172 and is provided with a forwardly extending ear 175. A movable clamp jaw support block 176 is secured to the end 177 of the slide 172 and extends thereabove. A movable jaw face 178 is secured to the movable jaw support block 176 by means of bolts 179 or the like. The jaw faces 178 and 168 are positioned in opposed relation above the surface of the base member 144.

An actuating link 180 extends into the slot 170 of the stationary jaw support 169 and is pivotally secured therein by means of a pivot pin 181 extending through the bore 171. The link 180 has a longitudinally and vertically offset portion 182 which extends above the ear 175. A pair of links 183 and 184 have one of their ends pivoted to the link 180 by means of a pivot pin 185 and their other ends pivoted to the ear 175 by means of a pivot pin 186.

A pneumatic ram 187 is pivotally carried by the ear 155 on a pivot pin 188. A yoke 189 is carried by the lower end of the piston rod 190 extending from the pneumatic ram 187 and is secured to the offset portion 182 of the link 180 by means of a pivot pin 191.

Movement of the piston rod 190 upwards into the pneumatic ram 187 will cause the links 183 and 184 to lift, pulling the block 173 and slide 172 toward the stationary jaw support 167 and causing the movable jaw support 176 to move away therefrom, thus separating the jaw faces 168 and 178 to permit work to be inserted or removed therefrom. Obviously, movement of the piston rod 190 in the opposite direction will close the jaw faces 168 and 178.

The jaw faces 168 and 178 are formed as male and female dies for gripping the opposite sides of a strip of work 192. The upright plate 152 is cut away as at 193 to permit the movement of the plate 152 around the die 52. The chamfer 150 on the base plate 144 is for a similar purpose, while the chamfer 149 permits the base plate 144 to tilt forwardly and downwardly with relation to the clamp pivot plate 124.

A double acting pneumatic valve 194 is mounted on the support plate 48 and is connected to opposite sides of the pneumatic ram 60 by means of conduits 195 and 196. A double acting pneumatic valve 197 is mounted on the support plate 198 carried by the rear ends of the beams 45 and 47 and is connected by means of conduits 199 and 200 to opposite sides of the pneumatic ram 187. A double acting pneumatic valve 201 is mounted on the support plate 198 and is connected by means of conduits 202 and 203 to opposite sides of the pneumatic rams 89.

A control valve 204 is connected to one end of the valve 197 and is adapted to move the valve to supply fluid to the conduit 199. Control valve 205 is connected to the opposite side of the valve 197 and is adapted to move the valve 197 to supply fluid to the conduit 200. Control valve 206 is connected to one end of the valve 201 and is adapted to move the valve to supply fluid to the conduit 202.

Control valve 207 is connected to the opposite end of the valve 201 and is adapted to move the valve to supply fluid to the conduit 203. A control valve 208 is connected to one end of the valve 194 and is adapted to actuate the control valve 194 to supply fluid to the conduit 195. A control valve 209 is connected to the opposite end of the valve 194 and is adapted to move the valve 194 to supply fluid to the conduit 196.

It should be noted that the valve 209 is illustrated as being positioned to be operated by the movement of portions of the ram 60, whereas the remaining control valves 204, 205, 206, 207 and 208 are positioned so as to be operated by hand. Pneumatic supply for the valves 194, 197 and 201 is supplied from a source of pneumatic pressure through a common supply line 210.

A hydraulic pump 211 is driven by a motor 212 and has a reservoir 213 associated therewith. A supply line 214 extends to each of the hydraulic rams 133 to supply hydraulic pressure to one end thereof. The hydraulic pump maintains a predetermined pressure on the rams 133 and a by-pass valve 215 permits excess pressures to be bled through a conduit 216 into the reservoir 213. A conduit 217 supplies the hydraulic pump 211 with hydraulic fluid from the reservoir 213. It can readily be seen that the hydraulic rams 133 provide a constant pressure in one direction.

In the use and operation of the invention disclosed in Figures 1 through 24, a strip of work 192, which is adapted for use as windshield molding, rear window molding, and other molding on a motor vehicle or any other device where such material is used, is positioned on the dies 52 and 53 and the ends thereof are clamped between the jaws 168 and 178 with the apparatus in the position as illustrated in Figures 22 and 23.

Noting particularly Figure 23, it can be seen that the jaws 168 and 178 are in a line extending tangent to the dies 52 and 53. A control valve 204 is actuated closing the movable jaw 178 against the fixed jaw 168 and clamping the work 192 therebetween. The valve 206 is then actuated either automatically upon the closing of the jaws 178 or by hand causing the piston rods 91 to be advanced from their respective cylinders 89 to rotate each swivel plate 68 on the mounting plates 63 about the pivots 69 to swing the jaws 178 from their Figure 23 position to their Figure 1 position. The connecting bar 73 engaging the pinion gears 72 will maintain the swivel plates 68 in timed relation to each other.

As the swivel plate 68 pivots about the pivot pin 69, the roller 87 on the roller tongue 85 will engage the surface 117 on the cam 103 causing the slide plate 80 to move outwardly on the swivel plate 68 away from the pivot pin 69. This movement will move the jaws 168 and 178 outwardly in a linear direction along the length of the work 192 causing the work 192 to be stretched around the curved face of the dies 52 and 53, while the jaws 168 and 178 are maintained in tangent alignment with the dies 52 and 53 by means of the pivot plate 124 which is guided by the cam follower 129 acting on the cam plates 56 and 57 under pressure of the hydraulic ram 133.

As the roller 159 on the arm 156 approaches the rear portion of the cam plates 161 and 164 it encounters a sharply sloped portion 218 on the cam surface 163 which causes the arm 156 to swing upwardly tilting the clamp base plate 144 about the pivot pin 143 to a generally horizontal position illustrated in Figures 1, 2 and 4.

The movement of the clamp base plate 144 about the pivot 143 causes the jaws 168 and 178 to follow the vertical curvatures in the dies 52 and 53 thus moving the work 192 into contact with the dies 52 and 53 throughout their length. The outward movement of the jaws 168 and 178 stretching the work 192 longitudinally sets the metal thereof so that it will retain the curvature of the dies 52 and 53 about which it is formed.

When the mechanism reaches the position as illustrated in Figure 1, the pneumatic ram 60 is operated by the valve 208 severing the work 192 at its mid point between the dies 52 and 53 or marking the work where it is to be left in one piece. Movement of the mechanism controlled by the ram 60 will actuate the valve 209 causing the ram 60 to return to its upper position. When the mechanism reaches the position illustrated in Figure 1, and after the ram 60 is actuated, the jaws 168 and 178 are opened by operation of the valve 205 either automatically or by hand and the work is removed.

After the work 192 is removed, the valve 207 is actuated and the pneumatic rams 89 return the mechanism to the position illustrated in Figures 22 and 23.

In the modified form of the invention illustrated in Figures 25 through 28, a cam plate 56a having a cam slot 56b in the lower face thereof is substituted for the cam plate 56 in the preferred form of the invention, and an arm 129a projects from the clamp pivot plate 124a and is provided at its outer end with a roller cam follower 130a which engages in the groove 56b. The cam groove 56b and cam roller 130a act to maintain the jaws 168 and 178 in tangent alignment with the dies 52 for the same purpose as described in the preferred form of the invention.

Having thus described the preferred embodiments of the invention, it should be understood that numerous other structural modifications and adaptations may be resorted to without departing from the scope of the appended claims.

What is claimed is:

1. A stretch-bender for metal molding comprising a horizontal table, an arcuate die mounted on said table medially thereof, a horizontal swivel plate, a vertical pivot securing said swivel plate to said table adjacent one end of said die, a horizontal slide plate, means securing said slide plate to said swivel plate for horizontal sliding movement thereon, a horizontal arcuate cam bar secured to said table outwardly of said swivel plate and said slide plate, means on said slide plate engaging said cam whereby said slide plate is moved horizontally on said swivel plate under control of said cam bar, a horizontal pivot plate positioned on said slide plate, vertical pivot means securing said pivot plate to said slide plate at a point horizontally spaced from said first vertical pivot, a stationary horizontal arcuate cam mounted on said table adjacent said one end of said die, means on said pivot plate engaging said last named cam to control the pivotal movement of said pivot plate with respect to said slide plate, a separable molding clamp spaced vertically above said pivot plate, means including a horizontal pivot supporting said clamp on said pivot plate, a fence cam mounted on said cam bar, means extending laterally from said molding clamp engaging said fence cam to tilt said clamp about its horizontal pivot under control of said fence cam, means for rotating said swivel plate about its vertical pivot, means for maintaining the cam engaging means on said pivot plate in engagement with said stationary arcuate cam, and means on said clamp for actuating said clamp.

2. A device as claimed in claim 1 wherein said clamp includes a body, said body having a longitudinal slot in the upper surface thereof, a plate slidably positioned in said slot, a movable jaw secured to one end of said last named plate, a stationary jaw secured to said body medially thereof in bridging relation to said slot, said stationary jaw and said movable jaw being positioned in opposition to each other, a link having one end connected to said plate, a second link connecting said stationary jaw to said first named link on said plate, and means carried by said body for moving said last named link to move said first named link and said movable jaw with relation to said stationary jaw.

3. A device as claimed in claim 2 wherein said means for moving said last named link, said first named link and said movable jaw with relation to said stationary jaw comprises a pneumatic ram, and means suspending said pneumatic ram above said jaws on said clamp.

4. A device as claimed in claim 3 wherein the means suspending said penumatic ram comprises a pair of upright arms secured to said clamp, a cross member connecting the upper ends of said upright arms, and means on said cross member for pivotally mounting said pneumatic ram thereon.

5. A device as claimed in claim 1 wherein means are provided for horizontally adjusting said cam bar with respect to said table.

6. A device as claimed in claim 1 wherein adjustable means are provided on said table to limit the pivotal movement of said swivel plate in each direction with respect to said table.

References Cited in the file of this patent

UNITED STATES PATENTS

| | | |
|---|---|---|
| 1,264,248 | Yoder | Apr. 30, 1918 |
| 1,968,010 | Bailey | July 31, 1934 |
| 2,165,614 | Cook | July 11, 1939 |
| 2,190,423 | Henricson | Feb. 13, 1940 |
| 2,476,556 | Maize | July 19, 1949 |
| 2,515,734 | Rathgen | July 18, 1950 |
| 2,516,256 | Robinson | July 25, 1950 |
| 2,527,412 | Green | Oct. 24, 1950 |
| 2,656,748 | Hugo | Oct. 27, 1953 |
| 2676,638 | Wheeler | Apr. 27, 1954 |

FOREIGN PATENTS

| | | |
|---|---|---|
| 482,769 | Great Britain | Mar. 4, 1953 |
| 105,395 | Sweden | Sept. 1, 1942 |
| 1,029,352 | France | Mar. 4, 1953 |